United States Patent
Bryar et al.

(10) Patent No.: US 10,206,112 B2
(45) Date of Patent: Feb. 12, 2019

(54) APPARATUS, SYSTEMS AND METHODS PROVIDING DIAGNOSTIC AND PROGRAMMING ACCESS TO INTELLIGENT ELECTRONIC DEVICES IN ELECTRICAL POWER INSTALLATIONS

(71) Applicant: ABB Schweiz AG, Baden (SE)

(72) Inventors: Kenneth James Bryar, Pleasant Unity, PA (US); Ronald Albert Kupiec, Chagrin Falls, OH (US)

(73) Assignee: ABB Schweiz AG, Baden (CH)

( * ) Notice: Subject to any disclaimer, the term of this patent is extended or adjusted under 35 U.S.C. 154(b) by 232 days.

(21) Appl. No.: 15/378,800

(22) Filed: Dec. 14, 2016

(65) Prior Publication Data
US 2018/0167815 A1  Jun. 14, 2018

(51) Int. Cl.
*H04W 12/08* (2009.01)
*H04L 29/06* (2006.01)
*H04W 76/10* (2018.01)

(52) U.S. Cl.
CPC .............. *H04W 12/08* (2013.01); *H04L 63/10* (2013.01); *H04W 76/10* (2018.02)

(58) Field of Classification Search
CPC ........ H04W 12/08; H04W 76/10; H04L 63/10
See application file for complete search history.

(56) References Cited

U.S. PATENT DOCUMENTS 6,973,589 B2 * 12/2005 Wright ..................... H04L 51/18
714/14
7,882,220 B2  2/2011 Wimmer
(Continued)

FOREIGN PATENT DOCUMENTS

CN  201699742  1/2011
CN  105186697  12/2015

OTHER PUBLICATIONS

Search Report and Written Opinion, PCT Appln. No. PCT/US17/66326, dated Mar. 1, 2018, 9 pgs.
(Continued)

*Primary Examiner* — Matthew T Henning
(74) *Attorney, Agent, or Firm* — J. Bruce Schelkopf; Taft Stettinius & Hollister LLP

(57) ABSTRACT

Apparatuses, systems and methods for providing a remote user computing system with secure wireless diagnostic and programming access to an IED operatively coupled with electrical substation equipment are disclosed. An exemplary apparatus comprises a portable computer system comprising a processor and one or more non-transitory memory media storing executable instructions and a cellular modem in operative communication with one another. An antenna external to the portable computer system is adapted to be operatively coupled with the cellular modem and physically positionable independently from the portable computer system. A communication interface adapted to establish a physical electronic communication link between the portable computer system and the IED. The portable computer system, the antenna and the communication interface being provided in a human portable kit. The executable instructions comprise remote user computing system access control instructions, IED access control instructions, and a set of IED diagnostic and programming instructions.

14 Claims, 2 Drawing Sheets

(56) References Cited

U.S. PATENT DOCUMENTS

| | | | |
|---|---|---|---|
| 8,892,699 B2 | 11/2014 | Mann | |
| 9,785,173 B2 * | 10/2017 | Cioraca | H04L 67/125 |
| 2006/0133454 A1 * | 6/2006 | Beckwith | H04W 92/18 |
| | | | 375/140 |
| 2011/0270550 A1 | 11/2011 | Kriess | |
| 2012/0144187 A1 | 6/2012 | Wei | |

OTHER PUBLICATIONS

Sachan, Amit, "Microcontroller Based Substation Monitoring and Control System with Gsm Modern", Journal of Electrical and Electronics Engineering, Jul.-Aug. 2012, vol. 1, Issue 6, pp. 13-21.

Ranvir, Kunal V. et al., "Substation Monitoring System", International Journal of Engineering and Technical Research, Feb. 2015, vol. 3, Issue 2, pp. 306-308.

Barejo, Ghouse Buksh et al., "Remote Microcontroller Based Monitoring of Substation and Control System through GSM Modern", Internatoinal Journal of Scientific & Engineering Research, Jan. 2016, vol. 6, Issue 1, pp. 714-720.

"Substation Automation for the Smart Grid", White Paper—Public Information, as Early as 2010, pp. 1-4, Cisco Systems Inc.

\* cited by examiner

APPARATUS, SYSTEMS AND METHODS PROVIDING DIAGNOSTIC AND PROGRAMMING ACCESS TO INTELLIGENT ELECTRONIC DEVICES IN ELECTRICAL POWER INSTALLATIONS

BACKGROUND

The present application relates to apparatuses, systems and methods providing diagnostic and programming access to intelligent electronic devices in electrical power substations and other electrical power transmission and distribution installations. Such substations and installations typically utilize a particular class of electronic devices known to those of skill in the art as intelligent electronic devices (referred to herein as an "IED" or "IEDs"). IEDs can be utilized to perform monitoring and diagnosis of a variety of electrical equipment of an electric substation or installation. IEDs may be operatively coupled with a variety of electrical equipment including circuit breakers, transformers and switchgear among other equipment. Such electrical equipment may be connected by a utility operator network to an electronic control system which is structured to control operation of the electrical equipment. Access to such utility operator networks must be carefully controlled and limited to provide a high level of security for the electric power grid. While IEDs may be coupled with utility operator networks, the restricted nature of these networks limits connectivity to at most the utility operator network and sometimes to the substation or subcomponents thereof. This limited connectivity can pose a significant loss of time and cost increase when subject matter expert (SME) support is needed. Utilities are forced to require onsite support by SMEs or have to accept delays for SMEs to visit substation installations on an as needed basis. In either case, the utility is constrained by SME personnel availability at a particular location. There remains a significant need for the unique apparatuses, methods and systems disclosed herein.

DISCLOSURE OF ILLUSTRATIVE EMBODIMENTS

For the purposes of clearly, concisely and exactly describing illustrative embodiments of the present disclosure, the manner and process of making and using the same, and to enable the practice, making and use of the same, reference will now be made to certain exemplary embodiments, including those illustrated in the figures, and specific language will be used to describe the same. It shall nevertheless be understood that no limitation of the scope of the invention is thereby created, and that the invention includes and protects such alterations, modifications, and further applications of the exemplary embodiments as would occur to one skilled in the art.

SUMMARY OF THE DISCLOSURE

One embodiment is a unique apparatus for providing a remote user computing system with secure wireless diagnostic and programming access to an IED operatively coupled with electrical substation equipment. The apparatus comprises a portable computer system comprising a processor and one or more non-transitory memory media storing executable instructions and a cellular modem in operative communication with one another. An antenna external to the portable computer system is adapted to be operatively coupled with the cellular modem and physically positionable independently from the portable computer system. A communication interface adapted to establish a physical electronic communication link between the portable computer system and the IED. The portable computer system, the antenna and the communication interface being provided in a human portable kit. The executable instructions comprise remote user computing system access control instructions, IED access control instructions, and a set of IED diagnostic and programming instructions. Further embodiments, forms, objects, features, advantages, aspects, and benefits shall become apparent from the following description and drawings.

DETAILED DESCRIPTION OF ILLUSTRATIVE EMBODIMENTS

Figure 1:
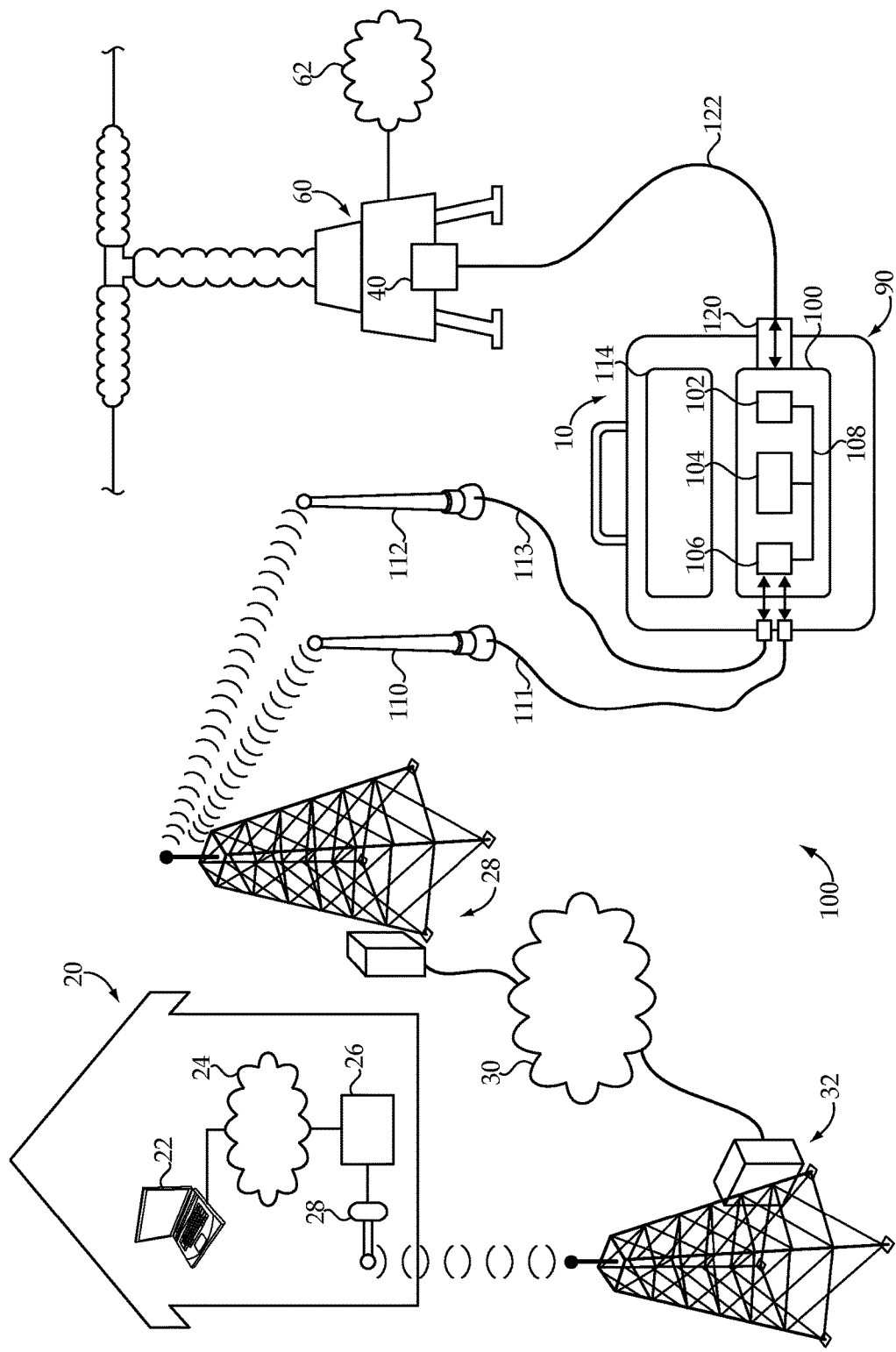
FIG. 1 illustrates an exemplary system for providing a remote user computing system with diagnostic and programming access to an intelligent electronic device (IED) in an electric substation.

With reference to FIG. 1 there is illustrated a system 100 including a human portable diagnostic kit 10 which is particularly configured to provide a SME operating a remote user computing system 22 at a remote location 20 with secure wireless diagnostic and programming access to an IED 40 operatively coupled with electrical substation equipment 60. Electrical substation equipment 60 is operatively coupled with a utility operator network 62 and may receive control commands from one or more controllers or a central control station (not illustrated). In the illustrated embodiment electrical substation equipment 60 is configured as a circuit breaker whose operation may be controlled via utility operatory network 62. Further embodiments contemplate IEDs operatively coupled with other types of electrical substation equipment including, for example, transformers, switchgear, motors and other equipment adapted to control the transmission or distribution of electrical power over electrical grid infrastructure.

Human portable diagnostic kit 10 includes a portable computer system 100 which includes a processor 102, one or more non-transitory memory media 104 configured to store executable instructions and a cellular modem 106 all of which are in operative communication with one another via one or more communication busses 108. Portable computer system 100 is provided in a case 90 having a size and weight adapted for transportation by a human technician. Case 90 also contains one or more compartments 114 for receiving additional components of portable diagnostic kit 10. Portable computer system 100 may be provided in a number of configurations. In a preferred embodiment portable computer system 100 comprises a hardened industrial PC comprising one or more processors and one or more non-transitory computer readable media and which may include an integral cellular modem or be operatively coupled with an external cellular modem. It shall be appreciated that in various embodiments the one or more non-transitory memory media 104 may be shared by the processor 102 and the cellular modem 106 and/or may include distinct memory devices separately serving processor 102 and cellular modem 106.

Portable diagnostic kit 10 includes a first antenna 110 and a second antenna 112. Antennae 110, 112 are external to the portable computer system and operatively coupled with the cellular modem 106 of portable computer system 100 via cables 111, 113. Antennae 110, 112 are physically positionable independently from the portable computer system 100 and case 90 as well as from one another. Cellular modem 106 may utilize one or both of antennae 110, 112 to communicate with a cellular tower 28 positioned in communication range of substation equipment 60. In the illustrated form, cellular modem 106 utilizes antenna 100 for transmitting and antenna 112 for receiving. Cellular modem may also be structured to utilize only one of antennae 110, 112 for both transmitting and receiving, for example, when one of antennae 110, 112 has superior signal strength for communication with cellular tower 28. When not in use, antennae 110, 112 and cables 111, 113 may be received in one or more compartments 114 for storage.

Portable diagnostic kit 10 further includes at least one communication interface 120 and a cable 122 which is connected to communication interface 120 and to IED 40 in order to establish a physical electronic communication link between portable computer system 100 and IED 40. When not in use, cable 122 may be received in one or more compartments 114 for storage. Certain embodiments comprise a plurality of different types of interfaces. A preferred embodiment includes a Cat 5 interface, an RS232 interface, a USB interface and a fiber-optic interface. Compatible cabling for each type of interface present in portable diagnostic kit as well as power cord cabling for the portable computer system 110 is also provided and may be received in one or more compartments 114 for storage.

As noted above, a SME may operate a remote user computing system 22 at a remote location 20 to perform remote diagnostic and programming operations on IED 40. In the illustrated embodiment the remote user computing system 22 and a server 26 are operatively coupled via a network 24 which may be a local area network (LAN) or wide area network (WAN) maintained by the SME's organization, for example, an OEM provider of IED 40. Server 26 includes or is coupled with a cellular modem which is operatively coupled with an antenna 28 to transmit and receive communication with cellular tower 32. Communication between cellular towers 28, 32 is provided over external network 30. This network configuration permits selective communication between remote user computing system 22 and portable computer system 100. In other embodiments a different communication network configurations may be utilized up to points of cellular tower 28 which establishes the final network link to portable computer system 100.

Portable computer system 100 is specially adapted to provide secure wireless diagnostic and programming access to an IED 40 operatively coupled with electrical substation equipment 60. In addition to and in combination with the features discussed above the executable instructions stored in the one or more or more non-transitory memory media 104 of computing system 100 serve this end and shall now be described further.

Figure 2:
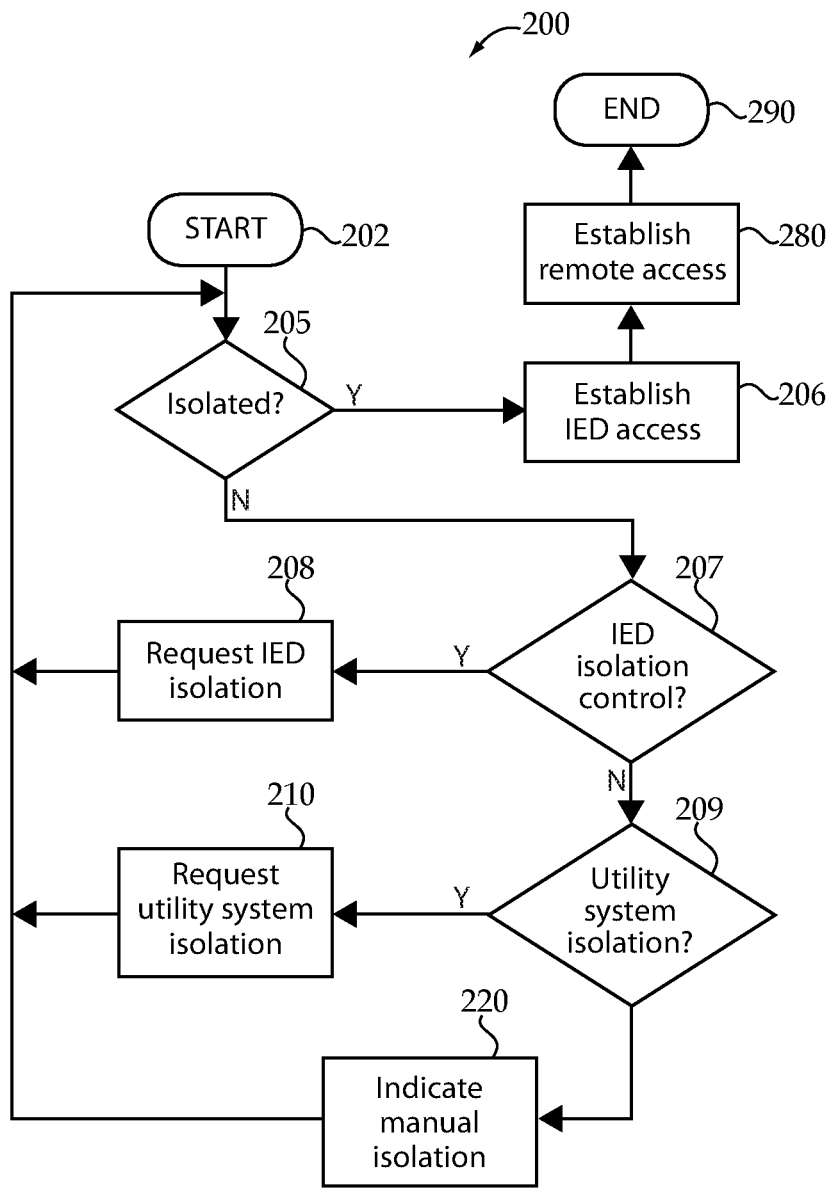
FIG. 2 illustrates a diagram of certain executable instructions stored in one or more non-transitory memory media of a portable computer system.

With reference to FIG. 2 there is illustrated a block diagram of exemplary IED access control instructions 200 stored in the one or more non-transitory memory media 104 of portable computer system 100. IED access control instructions 200 are configured to establish data reading and writing access to the IED 40 by the portable computing system 100 without establishing data reading and writing access to electrical substation equipment 60 or power utility network 62 and to verify that the IED 40 is effectively isolated from providing such access thereby maintaining desired restrictions on access to utility network and the substation equipment and devices connected thereto.

The processes for establishing and verifying appropriate isolation of IED 40 preferably account for a variety of possible hardware configurations that may be encountered. In some instances, isolation between IED 40 and electrical substation equipment 60 and power utility network 62 may already be present. Thus may occur, for example, where IED 40 is isolated from electrical substation equipment 60 and power utility network 62 by the lack of a communication channel as described above. In some instances, a firewall may be in place to restrict access to the utility network via the IED connection thereto. A firewall may also be put in place to restrict access to the portable diagnostic kit 10 and/or SME network via the IED connection thereto. In some instances, selectable isolation may be provided by the IED 40 executing an operation to isolate itself by suspending or blocking communication or transmission to electrical substation equipment 60 and power utility network 62. In further instances, selectable isolation may be provided by the electrical substation equipment 60 and/or power utility network 62 executing an operation suspend or block communication from IED 40. In certain forms a DMZ network may be created to allow access from both the SME via portable diagnostic kit 10 and the power utility network to a subnetwork from which the information of the IED can be accessed while preventing access from the SME and/or portable diagnostic kit 10 to the utility network and vice versa. In additional instances action by a human technician may be required to provide appropriate isolation of IED 40.

IED access control instructions 200 account for the variety of instances of hardware configurations discussed above. IED access control instructions 200 begin at operation 202 at which point the portable computer system 100 is powered on and connected to IED 40 by cable 122. From 202 instructions 200 proceed to conditional 205 which evaluates whether IED 40 is appropriately isolated from electrical substation equipment 60 and power utility network 62. This evaluation may include a number of operations. Conditional 205 may evaluate whether the model number, serial number or of configuration of IED 40 establishes isolation by the lack of a communication channel from IED 40 to electrical substation equipment 60 and power utility network 62. Conditional 202 may also evaluate whether the operational state of IED 40, electrical substation equipment 60 and/or power utility network 62 indicates that any communication channel which may be is present has been suspended or blocked.

If conditional 205 evaluates that IED 40 is appropriately isolated, instructions 200 proceed to operation 206 which establishes data reading and writing access to the IED 40 by the portable computing system 100 without permitting access by the portable computing system 100 to the electrical substation equipment 60 or power utility network 62 with which the IED 40 is operatively coupled. From operation 206, instructions proceed to operation 280 which is further described below.

If conditional 205 evaluates that IED 40 is not appropriately isolated, instructions 200 proceed to conditional 207 which evaluates whether IED 40 is capable of appropriately isolating itself from electrical substation equipment 60 and/or or power utility network 62. If conditional 207 evaluates that IED 40 has such capability, instructions 200 proceed to operation 208 in which the portable computer system 100 requests IED 40 to perform an operation to isolate itself from electrical substation equipment 60 and power utility network 62. From operation 208, instructions 200 proceed to conditional 205 whose operation is described above.

If conditional 207 evaluates that IED 40 is not capable of isolating itself from electrical substation equipment 60 and/or power utility network 62, instructions 200 proceed to conditional 209 which evaluates whether the electrical substation equipment 60 and/or power utility network 62 have the capability to appropriately isolate IED 40. This evaluation may be based upon data stored in IED 40 or portable computing system 100 pertaining to the capabilities of a given substation or installation and does not require access by IED 40 or portable computer system 100 to electrical substation equipment 60 or power utility network 62.

If conditional 209 evaluates that electrical substation equipment 60 and/or power utility network 62 have appropriate isolation capability, instructions 200 proceed to operation 210 in which a request is transmitted to IED 40 or another a device operatively coupled with the electrical substation equipment 60 and/or power utility network 62 to, in turn, request a controller operatively coupled with the electrical substation equipment 60 and/or power utility network 62 to request the desired isolation IED 40. The relaying of requests ensures that portable computer system 100 is not granted undesired access to electrical substation equipment 60 and/or power utility network 62. From operation 210, instructions 200 proceed to conditional 205 whose operation is described above.

If conditional 209 evaluates that electrical substation equipment 60 and/or power utility network 62 do not have the appropriate isolation capability, instructions 200 proceed to operation 220 in which an indication is provided to a technician present at the location of IED 40 to disconnect IED 40 from electrical substation equipment 60 or otherwise manually interrupt communication therebetween. This instruction may be provided as a prompt output by portable diagnostic kit 10 such as an illuminated or flashing LED, audible tone or other perceptible output, or by prompting a SME operating remote user computing system 22 to contact the technician present at the location of IED 40 and request that the manual isolation be performed, for example, by initiating a voice call or electronic communication through another channel. From operation 220, instructions 200 proceed to conditional 205 whose operation is described above.

As noted above operation 206 establishes data reading and writing access to the IED 40 by the portable computing system 100 without permitting access by the portable computing system 100 to the electrical substation equipment 60 or power utility network 62 with which the IED 40 is operatively coupled. It shall be appreciated that prior to operation 206 such access is preferably not provided. Prior to execution of operation 206, the evaluations and operations described above may occur over a handshake and setup protocol in which the portable computer system 100 is permitted to transmit to and receive transmission from IED 40, but not to granted read or write access thereto.

As noted above, instructions 200 proceed from operation 206 to operation 280 which establishes two way communication between the remote user computing system 22 and the portable computing system 100. Preferably one or more security measures are imposed to remote restrict access to and communication from portable computing system 100 in response to transmissions received by wireless modem 106. In a preferred embodiment, operation 280 is adapted to evaluate the sender IP address of transmissions and to limit access to and responsive communication from the portable computer system 100 to a predetermined set of sender IP addresses, for example, one or more IP address of remote user computing system 22 and/or server 26. Additionally or alternatively, a virtual private network (VPN) may be established between portable computing system 100 and remote user computing system 22 and/or server 26. Use of the foregoing techniques restricts access to portable computer system 100 and diagnostic and programming access to IED 40 to SMEs computers and networks with predetermined characteristics.

Portable computing system 100 further includes IED diagnostic and programming instructions which are selectable by the remote user computing system 22, for example, by remote user selection of a diagnostic application preconfigured to invoke particular diagnostic and programming instructions or by a remote user selection of a system setting effective to impose selection of diagnostic and programming instructions on one or more applications or processes. In an exemplary embodiment such instructions may be provided as local processing IED diagnostic instructions, remote processing IED diagnostic instructions, and IED programming instructions. The local processing IED diagnostic instructions are configured to execute one or more diagnostic operations locally on the portable computer system. The locally executed diagnostic operations are preferably structured to download one or more data sets from to computing system 100 from IED 40 via communication interface 120 and cable 122, and to perform the one or more locally-executed diagnostic instructions on these data sets. The locally executed diagnostic instructions are further configured to transmit one or more results of the first diagnostic operation by the portable computing system 100 to the remote user computing system 22 via the cellular modem 106.

Certain types of diagnostic operations preferably utilize local processing IED diagnostic instructions. Diagnostic operations in which the SME has a need or use only for the results of a processing operation, such as a data trend or regression, may benefit from the use of local processing IED diagnostic instructions. Diagnostic operations which require a large amount of data but carry a moderate to low computational burden may also benefit from use of local processing IED diagnostic instructions. Examples of such diagnostic operations include data trend diagnostics which determine a data trend for a large data set. One non-limiting example of such diagnostic operations is a leak test for insulating or dielectric gas such as $SF_6$. The data set for an exemplary leak test may comprise pressure and temperature measurements performed 1 time per second which, over the course of a relevant analysis time, comprises a data set of significant size. The diagnostic value of the data set may reside in a trend of information for a period of time. For example, the slope of a line or curve fit to the data set (or to a data set determined therefrom such as pressure change normalized to temperature as a function of time) over a predetermined period of time may be evaluated relative to a threshold to detect a leak event. Such a diagnostic may benefit from local processing diagnostic instructions and communication of only the results of executing these instructions from the IED to the SME via portable diagnostic kit 10.

The remote processing IED diagnostic instructions are configured to store locally on the portable computer system 100 one or more data set downloaded from IED 40 via the communication interface 120 and cable 122 without performing a diagnostic operation the second data set and to transmit these one or more data to the remote user computing system 22 via the cellular modem 106 for performance of a second diagnostic operation by the remote user computing system 22. Certain types of diagnostic operations preferably utilize remote processing IED diagnostic instructions. Diagnostic operations which require a moderate to low amount of data but carry high computational burden preferably utilize remote processing IED diagnostic instructions. Examples of such diagnostic operations include circuit breaker life diagnostics. Breaker life diagnostics may utilize a rich set of information stored in power system Common format for Transient Data Exchange (COMTRADE) files which store oscillography and status data related to transient power system disturbances. Such files may store a wealth of data regarding breaker closing events including current as a function of time for multiple closing events, contact position as a function of time for multiple closing events, and contact velocity as a function of time for multiple closing events among other information. While some basic breaker life diagnostics such as comparing the number of closing events relative to a threshold may not require this data, more refined diagnostic determinations may be made by evaluation of a complete data set (or complete portions of the overall data set) to discriminate from among different possible service events, for example, by SME evaluation of graphical renderings of such data. Such a diagnostic require providing the complete data set or a complete portion of a data set from the IED 40 to the SME via portable diagnostic kit 10.

While illustrative embodiments of the disclosure have been illustrated and described in detail in the drawings and foregoing description, the same is to be considered as illustrative and not restrictive in character, it being understood that only certain exemplary embodiments have been shown and described and that all changes and modifications that come within the spirit of the claimed inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

The invention claimed is:

1. An apparatus for providing a remote user computing system with secure wireless diagnostic and programming access to an intelligent electronic device (IED) operatively coupled with electrical substation equipment, the apparatus comprising:
a portable computer system comprising a processor and one or more non-transitory memory media storing executable instructions and a cellular modem in operative communication with one another;
an antenna external to the portable computer system and adapted to be operatively coupled with the cellular modem and physically positionable independently from the portable computer system;
a communication interface adapted to establish a physical electronic communication link between the portable computer system and the IED;
the portable computer system, the antenna and the communication interface being provided in a human portable kit; and
the executable instructions comprising:
remote user computing system access control instructions configured to evaluate transmissions received by the cellular modem and to limit responsive communication from the portable computer system to received transmissions satisfying a remote user access criterion,
IED access control instructions configured to establish data reading and writing access to the IED by the portable computing system without establishing data reading and writing access to the electrical substation equipment with which the IED is operatively coupled, and
a set of IED diagnostic and programming instructions selectable by the remote user computing system including first IED diagnostic instructions, second IED diagnostic instructions, and IED programming instructions,
the first IED diagnostic instructions being configured to perform locally on the portable computer system a first diagnostic operation on a first data set downloaded from the IED via the communication interface and to transmit a result of the first diagnostic operation by the portable computing system to the remote user computing system via the cellular modem,
the second IED diagnostic instructions being configured to store locally on the portable computer system a second data set downloaded from the IED via the communication interface without performing a diagnostic operation on the second data set and to transmit the second data set to the remote user computing system via the cellular modem for performance of a second diagnostic operation by the remote user computing system, the IED programming instructions being configured to write data to the IED in response to commands from the remote user computing system received via the wireless modem.

2. The apparatus of claim 1 wherein the human-portable kit further comprises a second antenna external to the cellular modem and adapted to be operatively coupled with the cellular modem and physically positionable independently from the cellular modem, and wherein the cellular modem is selectably controllable to transmit via one of the antenna and the second antenna while receiving via the other of the antenna and the second antenna.

3. The apparatus of claim 1 wherein the remote user computing system access control instructions are configured to evaluate a sender IP address of transmissions and to limit responsive communication from the portable computer system to a predetermined set of sender IP addresses.

4. The apparatus of claim 1 wherein the first diagnostic operation performed by the first IED diagnostic instructions comprises determining a data trend of the first data set.

5. The apparatus of claim 4 wherein the first data set comprises temperature-normalized pressure data as a function of time.

6. The apparatus of claim 1 wherein the second diagnostic operation performed by the remote user computing system comprises a breaker life diagnostic operation.

7. The apparatus of claim 6 wherein the breaker life diagnostic operation comprises evaluation of information of one or more COMTRADE files.

8. A method of providing a remote user computing system with secure wireless diagnostic and programming access to an intelligent electronic device (IED) operatively coupled with electrical substation equipment, the method comprising:
transporting a human portable diagnostic kit to the location of the IED, the human portable diagnostic kit comprising a portable computer system comprising a processor and one or more non-transitory memory media storing executable instructions and a cellular modem in operative communication with one another, an antenna external to the portable computer system and adapted to be operatively coupled with the cellular modem and physically positionable independently from the portable computer system, and a communication interface adapted to establish a physical electronic communication link between the portable computer system and the IED;

operatively connecting the communication interface and the IED;

establishing two way communication between the portable computer system and the IED effective to provide data reading and writing access to the IED by the portable computing system without permitting access by the portable computing system to the electrical substation equipment with which the IED is operatively coupled;

in response to a diagnostic selection from the remote user computing system, executing one of first IED diagnostic instructions and second IED diagnostic instructions locally on the portable computer system, the first IED diagnostic instructions obtaining a first data set from the IED via the communication interface, performing a diagnostic operation on the first data set locally at the portable computer system, and transmitting a result of the first diagnostic operation by the portable computing system to the remote user computing system via the cellular modem, the second IED diagnostic obtaining a second data set from the IED via the communication interface without performing any diagnostic operation on the second data set locally at the portable computer system, and transmitting the second data set to the remote user computing system via the cellular modem for performance of a second diagnostic operation by the remote user computing system;

establishing two way communication between the remote user computing system including evaluating transmissions received by the cellular modem and permitting responsive communication only if the received transmissions satisfy a remote user computing system access criterion; and in response to a configuration selection from the remote user computing system, executing locally at the portable computer system IED programming instructions configured to write configuration data to the IED.

9. The method of claim 8 wherein the human-portable kit further comprises a second antenna external to the cellular modem and adapted to be operatively coupled with the cellular modem and physically positionable independently from the cellular modem, and wherein the cellular modem is selectably controllable to transmit via one of the antenna and the second antenna while receiving via the other of the antenna and the second antenna.

10. The method of claim 8 wherein the remote user computing system access control instructions are configured to evaluate a sender IP address of transmissions and to limit responsive communication from the portable computer system to a predetermined set of sender IP addresses.

11. The method of claim 8 wherein the first diagnostic operation performed by the first IED diagnostic instructions comprises determining a data trend of the first data set.

12. The method of claim 11 wherein the first data set comprises temperature normalized-pressure data as a function of time.

13. The method of claim 8 wherein the second diagnostic operation performed by the remote user computing system comprises a breaker life diagnostic operation.

14. The method of claim 13 wherein the breaker life diagnostic operation comprises evaluation of information of one or more COMTRADE files.

\* \* \* \* \*